Feb. 24, 1942.   E. A. SAHLIN   2,274,000
ELECTRODE SAFETY APPARATUS
Filed Oct. 16, 1941   3 Sheets-Sheet 1

Eric Albert Sahlin
INVENTOR
BY Walter E. P. Bradley
ATTORNEY

Feb. 24, 1942.　　　　E. A. SAHLIN　　　　2,274,000
ELECTRODE SAFETY APPARATUS
Filed Oct. 16, 1941　　　　3 Sheets-Sheet 2
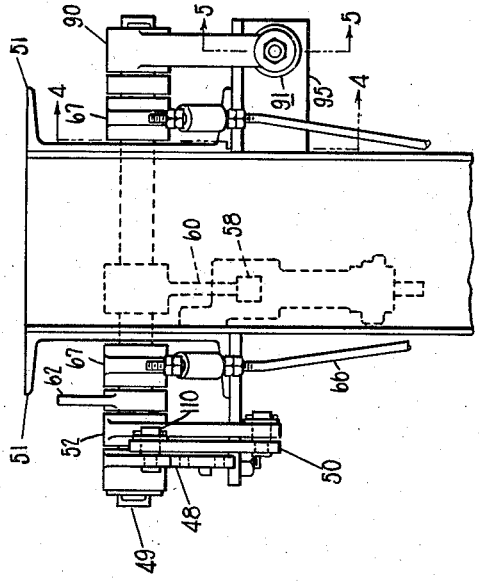
Eric Albert Sahlin INVENTOR
BY　Walter E. Bradley ATTORNEY Feb. 24, 1942. E. A. SAHLIN 2,274,000
ELECTRODE SAFETY APPARATUS
Filed Oct. 16, 1941 3 Sheets-Sheet 3
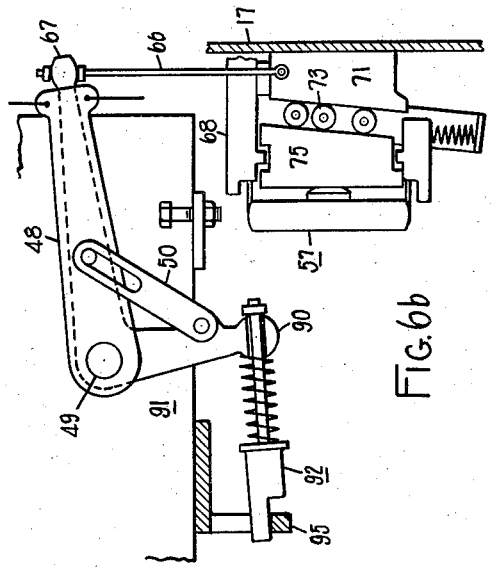
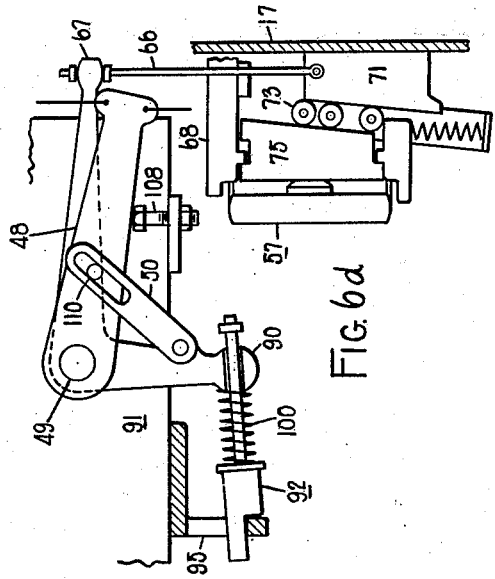
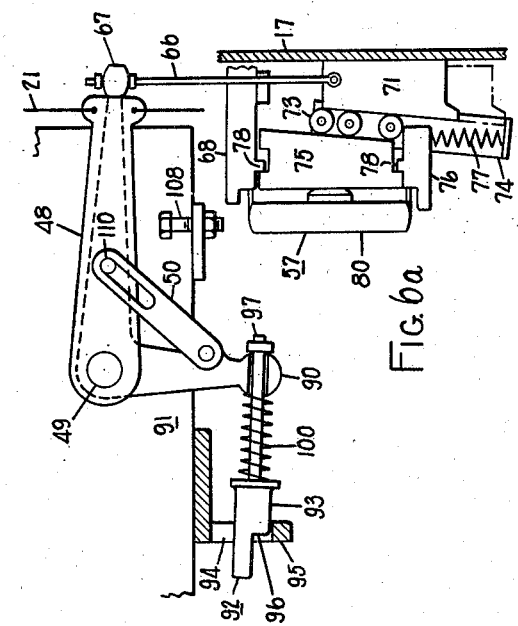
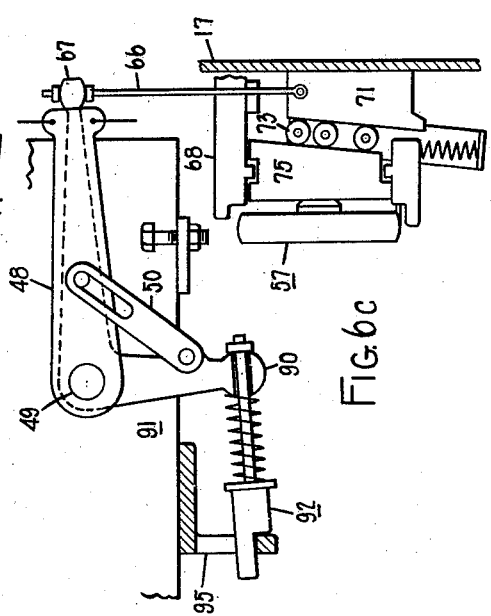
Eric Albert Sahlin INVENTOR
BY Walter E. P. Bradley ATTORNEY Patented Feb. 24, 1942

2,274,000

UNITED STATES PATENT OFFICE 2,274,000

ELEVATOR SAFETY APPARATUS

Eric Albert Sahlin, Westwood, N. J., assignor to Otis Elevator Company, New York, N. Y., a corporation of New Jersey Application October 16, 1941, Serial No. 415,223

9 Claims. (Cl. 187—90)

The invention relates to safety mechanism for elevators, especially to mechanism for operating safety brakes.

In elevator installations, the elevator car, and occasionally the counterweight, is provided with a safety brake for application to the guide rails to stop the body during its downward movement under emergency conditions, such as overspeed above a certain amount. There is advantage in arranging safety brakes so as to be self releasing, i. e., in the case of a car safety brake for example, so as to release the brake from the rails by upward movement of the car. When brakes of this character are employed and in cases where compensating ropes are not provided or, if provided where the tensioning sheave for the compensating ropes is not tied down, i. e., where the sheave is free to move upwardly or is tied down in such way as to yield under certain conditions, the car may be brought to an emergency stop under such conditions that the counterweight will jump and fall back. The counterweight in falling back jerks the car upwardly and this may be to an extent to release the safety brake with the result that it may have to be reapplied to again stop the car as it falls back.

One object of the invention is to maintain the rail clamps of a self releasing safety brake in engagement with the rails after operation of the safety brake until such time as it is desired to release the safety brake and reset its operating mechanism.

Another object of the invention is to prevent the falling back of a movable body of an elevator system under conditions where it is moved upwardly after having been brought to a stop by operation of its safety brake.

The invention involves the provision of locking mechanism for the safety brake operable to prevent the full release of the safety brake in the event the movable body moves upwardly after being brought to an emergency stop by the safety brake.

In carrying out the invention according to the arrangement which will be described and which is illustrated in connection with a self releasing safety brake on an elevator car, the operating mechanism for the safety brake is connected to a lock bolt which when the safety brake is applied is moved into a locking position with respect to a catch. In case the stop is made under conditions such that the counterweight jumps and falls back to jerk the car upwardly, the lock bolt is held against the catch and a spring associated with the lock bolt acts to hold the safety brake applied to the rails with a force such as to offer little resistance to the upward movement of the car but sufficient to cause the safety brake to act to hold the car after its upward movement stops. Thus, once the safety brake is applied it is held in engagement with the rails until the lock bolt is reset. The lock bolt is reset manually when the safety brake and operating mechanism are reset.

A general idea of the invention, the mode of carrying it out which is at present preferred, and various features and advantages thereof can be gained from the above statements. Other features and advantages of the invention will be apparent from the following description and appended claims.

In the drawings:

Figure 2 is an enlarged view somewhat schematic of the safety brake and operating mechanism therefor of Figure 1;

Figure 3 is a view in side elevation of a portion of the operating mechanism illustrated in Figure 2;

Figure 4 is a view in section taken along the line 4—4 of Figure 2;

Figure 5 is an enlarged section taken along the line 5—5 of Figure 2; and,

Figures 6a, 6b, 6c and 6d are views in side elevation illustrating somewhat schematically different operative positions of the safety brake and operating mechanism.

Figure 1:
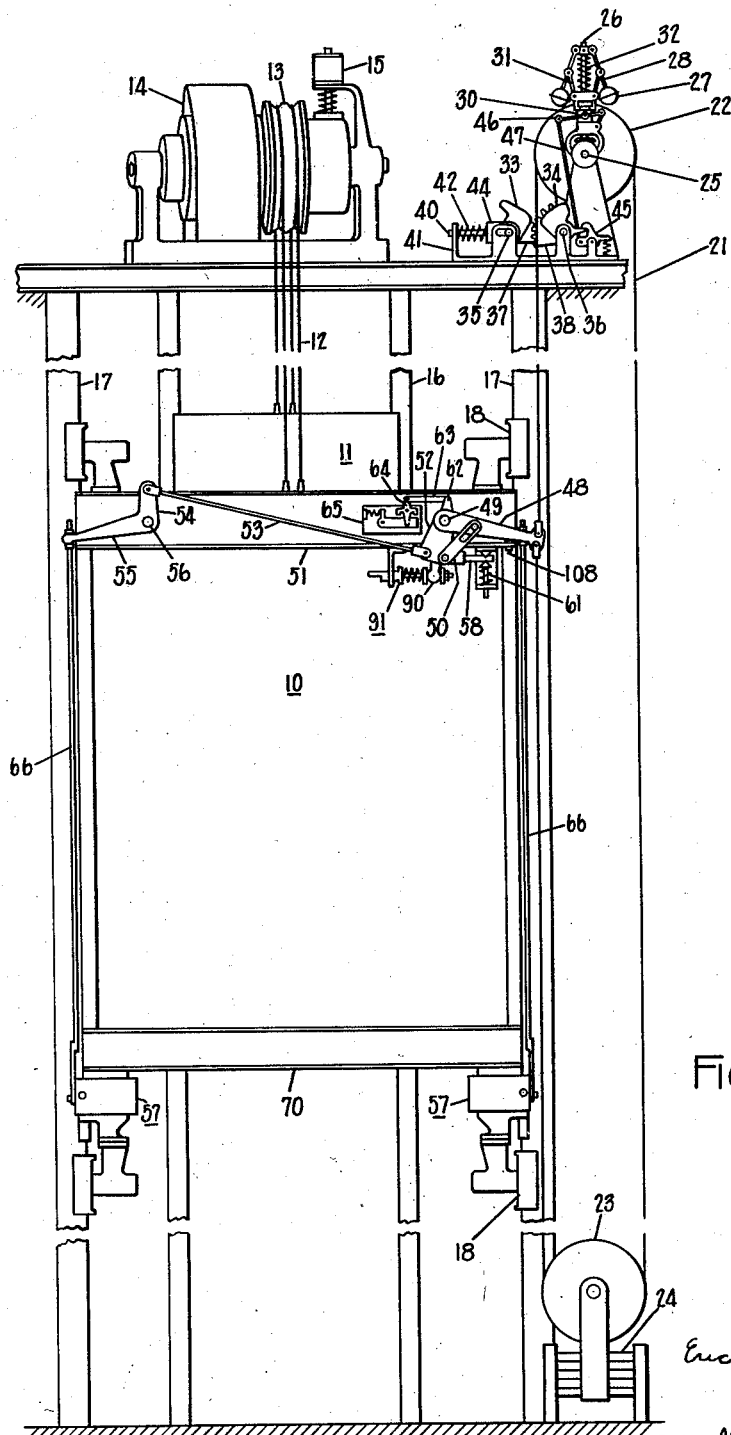
Figure 1 is a schematic representation of an elevator installation with the elevator car provided with a self releasing safety brake having operating mechanism embodying the invention.

Referring first to Figure 1, the elevator car 10 and counterweight 11 are suspended by hoisting ropes 12 passing over a hoisting sheave 13 driven by hoisting motor 14. 15 is an electromechanical brake for the hoisting motor. Guide rails 16 are provided for the counterweight while guide rails 17 are provided for the elevator car. Guide shoes 18 are carried by the elevator car for cooperation with guide rails 17 to guide the car in its movement up and down the elevator shaft.

A governor rope 21 extends around a governor sheave 22 at the top and a tensioning sheave 23 at the bottom of the hatchway, the tensioning sheave being provided with weights 24. Governor sheave 22 is mounted on a governor shaft 25, which is geared to a spindle 26. The governor is illustrated as of the fly ball type, being provided with centrifugal weights 27, weight arms 28, sleeve 30, connecting links 31, and resisting spring 32. Two eccentric clutches 33 and 34 are rotatably mounted on shafts 35 and 36 and are caused to move together by spur gear segments 37 and 38. Shaft 35 is mounted on movable rod 40, the rod being mounted in a frame 41. A spring 42, abutting against a portion of the frame and a collar 44 on the rod, biases clutch 33 toward clutch 34, this spring determining the pressure with which rope 21 is gripped by the clutches as it passes between them when the clutches are released. Thus governor rope 21 is allowed to slide through clutches 33 and 34 but at the same time exerts a pull sufficient to apply the safety. A spring pressed latch 45 engages a projecting portion of clutch 34 to prevent application of the clutches until the governor, acting through links 46 and 47, effects a release of the latch.

The ends of the governor rope are secured in rope sockets which are pivotally connected to a lever arm 48 of the brake operating mechanism. This lever is pivotally mounted on a shaft 49 extending through the upper cross channels 51 of the car framework. The lever is connected by a slotted link 50 to an arm 52 keyed to shaft 49. The arm 52 is connected by a link 53 to an arm 54 of a bell crank lever 55. This lever is secured to a shaft 56 extending through channels 51. The operating mechanism is latched in non-brake applying position by means of a link 58 pivotally connected to an arm 60 keyed to shaft 49 and yieldably held between a fixed pin and a movable pin by a spring 61, these pins extending into depressions formed in the link. Another arm 62 keyed to shaft 49 is connected by a link 63 to an operating trip 64 for the switch 65.

The safety brake comprises a pair of rail clamps 57 for engaging the guide rails 17. Referring now to Figure 2 in which the rail clamp is shown for the right hand side of the car as viewed in Figure 1, the rail clamp is operated by lift rods 66 secured to lever arms 67 keyed to operating shaft 49 one on each side of the cross channels 51. Operating lift rods are similarly connected to bell crank 55 of Figure 1 and a similar bell crank secured to shaft 56 in the other side of channels 51. The operating parts of the rail clamp are supported by a mounting block 68 secured to the safety channels 70 of the car framework. The shoes for engaging the guide rail are in the form of wedges 71, one on each side of the guide rail. These wedges are normally disengaged from the rail. To apply them to the rail, they are pulled upwardly by rods 66. As they move upwardly, these wedges slide against and roll on rollers 73 mounted in frames 74. The rollers, in turn, are arranged to roll on the inclined surfaces of guide blocks 75. The rollers are biased into position against stops 76 on mounting block 68 by springs 77 arranged between the mounting block and the bottoms of frames 74. The mounting block is arranged to guide the guide blocks 75 for movement normal to the side faces of the guide rail and provides stops 78 to limit their inward movement. A U spring 80 spans the guide blocks, this spring being under an initial pressure. Swivel joints 81 are provided between blocks 75 and the legs of the U spring, the spring being supported at its yoke on a portion of mounting block 68.

Assume that the elevator car is moving downwardly and that an emergency condition arises causing the car to overspeed. As soon as the car reaches a predetermined speed, the governor releases latch 45, allowing the clutches 33 and 34 to grip the governor rope. This lifts lever arm 48, pushing link 58 out of position in which it is held by spring 61. Shafts 49 and 56 are rotated to swing lever arm 67 and bell crank 55 upwardly. This lifts the rods 66 to pull wedges 71 upwardly. During the initial part of their movement, the wedges slide upon rollers 73. This continues until the wedges, due to their being pushed inwardly by the rollers, engage the sides of the guide rail. From this point on, the wedges roll on the rollers until they are brought to a stop by the mounting block 68. As soon as the wedges start to roll on the rollers, the rollers in turn roll on the inclined surfaces of the guide blocks 75, lifting their frames 74 upwardly against the force of springs 77. As this movement takes place, the guide blocks are forced outwardly by the wedges against the force of the U spring 80 so that the force with which the wedges are applied to the guide rail is gradually increased until the wedges are brought to a stop by the mounting block. In this way the elevator car is gradually retarded and is finally brought to a stop.

Referring now also to Figures 3, 4 and 5, the arm 52 which is operated through slotted link 50 by lever arm 48 is secured to shaft 49 on the left hand side of channels 51 as viewed in Figure 2. On the right hand end of the shaft is keyed an arm 90. This arm serves as the operating arm for a safety lock 91. The safety lock comprises a lock bolt 92 connected to arm 90 and having a locking member 93 extending through a slot 94 in a stop bracket 95 secured to the channel 51. The lock member is formed with a shoulder 96 and has a pin extending therefrom to form a stem 97 to which the arm 90 is connected. The lower end of the arm is bifurcated to straddle the stem and is maintained in connected relationship by a pin 98. A compression spring 100 is arranged on the stem between the locking member 93 and the arm 90, a spring seat 101 being formed on the locking member and a spring seat 102 being provided on the stem adjacent the arm. A spacing sleeve 103 is provided on the stem between seat 102 and a washer 104, being held in place by a nut 105 on the threaded end of the stem. This spacer insures space for relative angular movement of the arm 90 and the lock bolt upon operation of the safety brake. Adjusting shims 106 are provided at each end of the sleeve for adjusting arm 90 with respect to the lock bolt.

During normal operation of the car, the rail clamp and the operating mechanism including the safety lock are in the positions illustrated in Figures 2, 3, 4 and 5. Upon operation of the governor to stop the governor rope, lever arm 48 is held, acting through link 50 to swing shaft 49 counterclockwise as viewed in Figure 3. This causes the lift rods to be pulled upwardly to apply the rail clamps to the guide rails 17. At the same time arm 90 is swung counterclockwise, pulling the locking bolt to the right. When the point is reached where the wedges touch the rails, the lock bolt is in position with the shoulder 96 pulled half through the slot 94 as illustrated in Figure 6a. For convenience, only one half of the rail clamp is indicated in Figures 6a, 6b, 6c and 6d. When the rail clamp becomes fully applied, the lock bolt is in position with the shoulder 96 pulled in through the slot and dropped down in back of stop bracket 95, as illustrated in Figure 6b.

For example, should the conditions under which the emergency stop takes place be such that the counterweight continues its movement upwardly after the car has come to rest, the counterweight in falling back will jerk the car upwardly. While the force exerted to jerk the car upwardly might not cause enough upward movement of the car to disengage the wedges from the rail, it might be such that without the safety lock the rail clamps would be fully released. Under such conditions, the rail clamp would have to be reapplied, permitting the car to fall back. With the safety lock, however, as the car is pulled upwardly, the wedges, remaining in contact with the rail and thus pulling down on the lift rods, swing shaft 49 clockwise. Thus the safety lock operating arm 90 is swung clockwise pushing the locking bolt to the left. As this movement takes place a point is reached where the lock bolt is brought to a stop by the engagement of shoulder 96 with the stop bracket as illustrated in Figure 6c. The wedges are still in engagement with the guide rail at this time. Continued upward movement of the car acts to compress spring 100. The safety lock is arranged and the relationship of the arm 90 to the locking member is adjusted so that after a certain amount of compression of the spring 100 the wedges start to slide on the rails. Continued upward movement of the car after this point is reached causes lever arm 48 to be pulled downwardly by the governor rope. However the slot in link 50 permits this movement to take place without affecting shaft 49 and the arm is brought to a stop by stop screw 108 before the pin 110 on the arm reaches the end of the slot. This is the position illustrated in Figure 6d. Upon any further upward movement after this point is reached, the arm 48 rests on the stop screw so that any pull on the governor rope is not transmitted to the rail clamps. The pull on the lift rods exerted by the spring as the car continues to move upwardly holds the wedges between the rails and the guide blocks at a pressure which offers small resistance to the motion of the car. However, as the wedges are in contact with the rail at the instant the upward movement of the car ceases, they act immediately the car starts to move downwardly to prevent the car falling back.

To release the safety after it has been applied, the safety switch 65 is closed and the hoisting motor is energized to move the car upwardly. The lock bolt 92 is pushed up to enable the locking member 93 to pass through the slot 94 in the stop bracket. As the upward movement of the car takes place, the rail clamp wedges remain stationary on the rail. The guide blocks 75 move inwardly as upward movement of the car takes place and when they are brought to a stop by stops 78 the pressure of the wedges against the rail is discontinued so that the wedges are released and drop by gravity to the position of Figure 2 as upward car movement continues. This also resets the link 58 to be held by spring 61. The governor jaws are reset manually, placing the mechanism in condition for another operation.

While to illustrate the operation of the safety apparatus, a condition has been described in which the elevator car is jerked upwardly by the falling of the counterweight, it is to be understood that the locking mechanism is effective to prevent disengagement of the rail clamps from the rails regardless of the cause of the upward movement of the car. Although the safety apparatus has been described as applied to an elevator car, the invention is also applicable to safety apparatus applied to the counterweight. Also, although no compensating ropes are shown, it is to be understood that the invention is applicable to installations with or without compensating ropes. Where compensating ropes are provided, the invention is especially applicable to installations in which the compensating ropes are not tied down or tied down so as to yield under certain conditions although it would be of advantage to apply the invention also to rigidly tied down compensating sheave installations as it would insure the safety brake remaining applied to the rails regardless of the conditions of operation. Furthermore, the invention is applicable to other types of safety brakes which are released by upward movement of the movable bodies to which they are applied. The invention is also applicable to other arrangements of operating mechanism for the safety brake, including not only the mechanism carried by the car but also the governor operated apparatus and the construction of the governor. Also, the details of construction of the safety lock may be varied. Other changes may be made in the apparatus described and many apparently widely different embodiments of the invention may be made without departing from the scope thereof. It is, therefore, intended that all matter contained in the above description or shown in accompanying drawings shall be interpreted as illustrative and not in a limiting sense.

What is claimed is:

1. In an elevator system having a body movable in the elevator hatchway in which a safety brake is carried by the body adapted to be applied to the guide rails to stop the body during its descent and to be released by upward movement of said body, a lock for said brake, means operable upon operation of said brake for operating said lock, and means operable upon upward movement of said body with said lock in locking position to prevent the disengagement of said brake from the guide rails.

2. In an elevator system having a body movable in the elevator hatchway in which a safety brake is carried by the body adapted to be applied to the guide rails to stop the body during its descent and to be released by upward movement of said body, a lock for said brake, and means operable upon operation of said brake for operating said lock, said lock acting to prevent the disengagement of said brake from said rails until the lock is reset.

3. In an elevator system having a body movable in the elevator hatchway in which a safety brake is carried by the body adapted to be applied to the guide rails to stop the body during its descent and to be released by upward movement of said body, a lock bolt, a catch for said bolt, means operable upon operation of said brake for moving said bolt into locking position with respect to said catch, and resilient means operable upon upward movement of said body with said lock bolt in locking position to hold said brake in engagement with said rails.

4. In an elevator system having a body movable in the elevator hatchway in which a safety brake is carried by the body adapted to be applied to the guide rails to stop the body during its descent in case of excessive speed and to be released by upward movement of said body, an operating member for said brake carried by said body, a lock bolt, a catch for said bolt, said bolt and catch being carried by said body, means connected to said bolt and operable by said member in effecting operation of said brake for moving said bolt into locking position with respect to said catch, and resilient means operable upon upward movement of said body with said lock bolt in locking position to hold said brake in condition to permit said body to move upwardly but to prevent said body falling back after its upward movement has stopped.

5. In an elevator system having a body movable in the elevator hatchway in which a safety brake is carried by the body adapted to be applied to the guide rails to stop the body during its descent in case of excessive speed and to be released by upward movement of said body, an operating member for said brake carried by said body, a lock bolt, a catch for said bolt, said bolt and catch being carried by said body, means connected to said bolt and operable by said member in effecting operation of said brake for moving said bolt into locking position with respect to said catch, a spring operable upon upward movement of said body with said lock bolt in locking position to hold said brake in engagement with said rails, and means permitting relative movement of said operating member with respect to said lock bolt moving means during such upward movement of said body.

6. In an elevator system having a body movable in the elevator hatchway in which a safety brake is carried by the body adapted to grip the guide rails to stop the body during its descent in case of excessive speed and to be released by upward movement of said body, an operating arm for said brake carried by said body, a shaft connected to said arm to be rotated upon operation of the arm to effect brake application, means operable by rotation of said shaft for applying said brake, a lock bolt, a catch for said bolt, said bolt and catch being carried by said body, means connected to said bolt and operable by said shaft for moving said bolt into locking position with respect to said catch upon operation of the brake, and a spring operable upon upward movement of said body with said lock bolt in locking position to hold said brake in condition to prevent said body falling back after its upward movement has stopped.

7. In an elevator system having a body movable in the elevator hatchway in which a safety brake is carried by the body adapted to be applied to the guide rails to stop the body during its descent in case of excessive speed and to be released by upward movement of said body, a shaft rotatably mounted on said body, an operating arm for said brake carried by said body, means connecting said arm to said shaft to cause rotative movement thereof upon operation of the arm to effect brake application, means operable by said rotative movement of said shaft for applying said brake, a lock bolt, a stationary catch for said bolt, said bolt and catch being carried by said body, means connected to said bolt and operable by said shaft upon said rotative movement thereof to effect operation of said brake for moving said bolt into locking position with respect to said catch, and a spring associated with said bolt and operable upon upward movement of said body with said lock bolt in locking position to keep said brake in engagement with said rails so as to hold said body after its upward movement has stopped, said connecting means permitting relative movement between said arm and said shaft during such upward movement of said body.

8. In an elevator system having a body movable in the elevator hatchway in which a safety brake is carried by the body for gripping the guide rails to stop the body during its descent and in which the governor rope is gripped to cause operation of the brake in case the body in its descent exceeds a predetermined speed, said safety brake being releasable by upward movement of said body, an operating arm carried by said body connected to said governor rope, a shaft connected to said arm to be rotated thereby upon the gripping of said rope, means operable by said shaft for applying said safety brake, a stop member secured to said body, said stop member having a slot therein, a lock bolt movable in said slot, a second arm secured to said shaft and operably connected to said bolt for effecting movement thereof in said slot into locking position upon rotative movement of said shaft to operate the safety brake, and a compression spring on said lock bolt acting upon upward movement of said body with said lock bolt in locking position to maintain said safety brake applied to said rails with a pressure light enough to permit said body to move upwardly but sufficient to cause said safety brake to act to hold said body after its upward movement has stopped.

9. In an elevator system having a body movable in the elevator hatchway in which a safety brake is carried by the body for gripping the guide rails to stop the body during its descent and in which the safety brake is operated in case the body in its descent exceeds a predetermined speed by the action of the governor to cause the gripping of the governor rope, said safety brake being releasable by upward movement of said body, a shaft pivotally mounted on said body, an arm pivotally mounted on said shaft and connected to said governor rope, a second arm secured to said shaft, a link connected to said second arm, a pin on said first arm extending into a slot in said link for causing upon rotative movement of said first arm as a result of gripping of the governor rope rotative movement of said second arm and thus rotative movement of said shaft, means operable by said rotative movement of said shaft for applying said safety brake, a stop member secured to said body, said stop member having a slot, a locking member extending into said slot and having a stem, a third arm secured to said shaft and operably connected to said stem for moving said member in said slot upon rotative movement of said shaft to operate the safety brake, said locking member having a shoulder which drops behind said stop member when said safety brake is operated, and a compression spring on said stem between said stop member and said third arm, said shoulder engaging said stop member upon upward movement of said body after having its downward movement stopped by operation of said safety brake and said spring acting with said shoulder against the stop member to maintain said safety brake applied to said rails with a pressure light enough to permit said body to move upwardly but sufficient to cause said safety brake to act to hold said body after its upward movement has stopped.

ERIC ALBERT SAHLIN